United States Patent
Obermeier et al.

(10) Patent No.: US 10,990,684 B2
(45) Date of Patent: Apr. 27, 2021

(54) CONTEXT-AWARE SECURITY SELF-ASSESSMENT

(71) Applicant: ABB Power Grids Switzerland AG, Baden (CH)

(72) Inventors: Sebastian Obermeier, Rietheim (CH); Roman Schlegel, Wettingen (CH); Johannes Schneider, Feldkirch (AT); Thomas Locher, Zürich (CH); Matus Harvan, Luxembourg (LU)

(73) Assignee: ABB Power Grids Switzerland AG, Baden (CH)

( * ) Notice: Subject to any disclaimer, the term of this patent is extended or adjusted under 35 U.S.C. 154(b) by 89 days.

(21) Appl. No.: 16/134,342

(22) Filed: Sep. 18, 2018

(65) Prior Publication Data

US 2019/0130113 A1 May 2, 2019

Related U.S. Application Data

(63) Continuation of application No. PCT/EP2017/056080, filed on Mar. 15, 2017.

(30) Foreign Application Priority Data

Mar. 18, 2016 (EP) .................................... 16161175

(51) Int. Cl.
*G06F 21/57* (2013.01)
*G06F 21/74* (2013.01)
(Continued)

(52) U.S. Cl.
CPC ........... *G06F 21/577* (2013.01); *G05B 15/02* (2013.01); *G05B 19/4185* (2013.01);
(Continued)

(58) Field of Classification Search
CPC .... G06F 21/577; G06F 21/554; G06F 21/606; G06F 21/74; G06F 2221/034;
(Continued)

(56) References Cited

U.S. PATENT DOCUMENTS 7,552,480 B1 * 6/2009 Voss ...................... G06F 21/577
380/277
7,584,508 B1 9/2009 Kashchenko et al.
(Continued)

FOREIGN PATENT DOCUMENTS

EP 1768046 A2 3/2007

OTHER PUBLICATIONS

European Patent Office, International Search Report & Written Opinion issued in corresponding Application No. PCT/EP2017/056080, dated Jun. 23, 2017, 11 pp.
(Continued)

*Primary Examiner* — Malcolm Cribbs
(74) *Attorney, Agent, or Firm* — Slater Matsil, LLP

(57) ABSTRACT

The present invention generally relates to a context-aware security self-assessment method or module that determines the context in which the device is used and based on this, assesses the devices security settings. The context may refer to the system environment, the applications the device is used for, and/or the current life-cycle stage of the device, without being limited to said contexts. The method of the present invention preferably prioritizes and rates the security relevant findings and presents them in combination with mitigation options through a web interface, a configuration tool, or through notifications in the control system.

21 Claims, 2 Drawing Sheets

(51) Int. Cl.
   *H04L 29/06* (2006.01)
   *G06F 21/60* (2013.01)
   *G05B 15/02* (2006.01)
   *G05B 19/418* (2006.01)
   *G06F 21/55* (2013.01)

(52) U.S. Cl.
   CPC .......... *G06F 21/554* (2013.01); *G06F 21/606* (2013.01); *G06F 21/74* (2013.01); *H04L 63/1433* (2013.01); *G05B 2219/45103* (2013.01); *G06F 2221/034* (2013.01); *G06F 2221/2101* (2013.01)

(58) Field of Classification Search
   CPC .. G06F 2221/2101; G06F 21/50; G06F 21/51; G06F 21/52; G06F 21/57; G05B 15/02; G05B 19/4185; G05B 2219/45103; H04L 63/1433; H04L 63/14; H04L 63/1408; H04L 63/20
   See application file for complete search history.

(56) References Cited

U.S. PATENT DOCUMENTS

| | | | |
|---|---|---|---|
| 7,607,174 B1 | 10/2009 | Kashchenko et al. | |
| 9,294,495 B1* | 3/2016 | Francoeur | H04L 63/1433 |
| 2007/0006304 A1* | 1/2007 | Kramer | G06F 21/55 726/22 |
| 2008/0235801 A1* | 9/2008 | Soderberg | G06F 21/563 726/25 |
| 2010/0106958 A1* | 4/2010 | Watanabe | G06F 21/608 713/100 |
| 2012/0180133 A1 | 7/2012 | Al-Harbi et al. | |
| 2013/0219493 A1* | 8/2013 | Banzhof | H04L 63/1433 726/22 |
| 2014/0137257 A1 | 5/2014 | Martinez et al. | |
| 2014/0373161 A1 | 12/2014 | Hudson et al. | |
| 2016/0164919 A1* | 6/2016 | Satish | H04L 63/1416 726/1 |
| 2017/0171235 A1* | 6/2017 | Mulchandani | H04L 63/1425 |

OTHER PUBLICATIONS

European Patent Office, Extended Search Report issued in corresponding Application No. 16161175.1, dated Sep. 22, 2016, 6 pp.
"Generic SCADA Risk Management Framework for Australian Critical Infrastructure Developed by the IT Security Expert Advisory Group (ITSEAG)," Mar. 1, 2012, XP055180471, Retrieved from the Internet: http://www.tisn.gov/au/Documents/SCADA-Generic-Risk-Management-Framework.pdf.

* cited by examiner

| State | Setting | Info | Suggestion | Action |
|---|---|---|---|---|
| ☹ | Telnet | | | |
| 😐 | OPC Server | | | |
| ☺ | Local user Accounts | | | |
| ☹ | Password Policy | | | |
| ☹ | Internet Connectivity | | | |
| ☺ | Reverse Internet Connnectivity | | | |

| Setting | Description | Suggestion | Action |
|---|---|---|---|
| Telnet | Telnet is enabled, which is considered an unsecure protocol as the password is transmitted in plaintext. | Turn off Telnet | >>Click<< to configure Telnet |
| OPC Server | The OPC server of the device is up and running, but it has not received an OPC connection in 576 days. OPC server functionality can present a security risk. | Check whether an OPC server is needed, e.g., for emergency cases. If not, disable the server. | >>Click<< to configure OPC |
| Local User accounts | The device is not integrated into a central user account management system, but has local user accounts configured. | | |
| Passwort Policy | The password policy is not set. The device seems to be in the operational phase and not in engineering mode anymore. | Employ a password policy and require users with short password to change. | >>Click<< to configure password policy |
| Internet Connectivity | The device can access the Internet, but has not sent a data packet to the Internet in 741 days. | The current device usage does not motivate Internet access. Reconfigure the overall network settings. | Check general network accessibility |
| Reverse Internet Connectivity | The device cannot be directly accessed from the Internet, ckecked through webservices like ShieldsUP | The device should not be accessible from the Internet. | Check network settings |

Fig. 3

CONTEXT-AWARE SECURITY SELF-ASSESSMENT

FIELD OF THE INVENTION

The invention relates to the field of security settings and security self-assessment of systems and individual devices. In particular, the present invention generally relates to a context-aware security self-assessment method or module that determines the context in which the device is used and based on this, assesses the device's security settings.

BACKGROUND OF THE INVENTION

Industrial devices, in contrast to consumer devices, typically do not assist the user or operator in an assessment of the cyber security relevant settings. For example, an operator can enable insecure protocols that are not needed in a system, and a typical device is unaware that this setting is insecure and unneeded.

US 2012/0180133 discloses a system to perform a cyber security risk assessment on a plurality of process control networks and systems comprising a plurality of primary network assets at an industrial process facility. A central cyber security risk assessment computer comprises a scanning module configured to identify networks and systems topology of the plurality of process control networks and systems for the industrial process facility.

Moreover, static cyber security self-assessments are known in the customer router industry. Asus, for example, in cooperation with Trend Micro, has integrated a self-assessment feature in a router family (RT-AC87U, RT-AC68U) that checks for certain static settings, e.g., password length requirements met, UPnP disabled, port forwarding disabled, configuration interface access disabled from the Internet, Telnet access disabled, etc., to improve the overall security of both the device and the system.

A self-assessment feature is a good way to train awareness of cyber security, and to show that the vendor knows about the importance of security and how to best secure its products, thereby establishing a stronger trust relationship with the customer. However, a self-assessment feature in industrial devices cannot be implemented in the same way as it is done in known consumer IT products. The problem is that industrial devices are often used in very different ways and systems. Therefore, a setting that is considered secure in one system is not necessarily secure in another system. In addition, industrial systems often undergo various stages in their lifecycle, ranging from engineering and commissioning to factory acceptance tests, and, finally, operation. At each stage, different security settings are sensible. For example, a communication protocol such as Telnet might be used during engineering, but should be turned off in the operational phase.

DESCRIPTION OF THE INVENTION

It is therefore an object of the present invention to provide a method and system that supports an operator of the system and preferably a device of the system, preferably an industrial device, to check security settings and preferably adapt the security settings of the system and/or the device, depending on the mode of operation of the system and/or device.

The object of the invention is achieved by the features of the independent claims. Further preferred embodiments of the invention are defined in the dependent claims.

According to a preferred embodiment, the invention relates to a method for context-aware security self-assessment of a system. More specifically, the invention relates to a method for context aware security self-assessment of an industrial device, wherein the self-assessment is preferably performed on the industrial device itself. For instance, the present invention may be used for an Industrial Automation and Control System (IACS) or individual devices of such an IACS.

Preferably, the method relates to a dynamic security self-assessment, such that the assessment may change during operation and is not limited to predetermined static rules. For instance, an industrial device undergoes various stages in its lifecycle, ranging from engineering and commissioning to factory acceptance tests, and, finally, operation. At each stage, different security settings can be dynamically set. The method of the present invention preferably comprises at least one of the following method steps.

Based on a defined or predefined rule set, the current context of the system and/or device is assessed. Preferably, the current context of the device is assessed by the device itself. Security relevant settings (in the following also called security settings) for the system and/or device based on the assessed current context of the system are also assessed. Preferably, the presently used security settings of the system are also based on a predefined and customizable set of security assessment checks for the context. Then, a single suggested action or a plurality of suggested actions are preferably provided to a user and/or operator on the basis of the assessed security settings to change or confirm the present security settings of the system to the suggested settings. Preferably the suggested action(s) to a user/operator are provided on the basis of the assessed security settings and/or the assessed context, to adapt the present security settings to the suggested settings. Preferably the suggested action(s) to a user/operator are provided on the basis of both, the assessed security settings and the assessed context, to adapt the present security settings to the suggested settings. In other words, the operator and/or user adapts the security settings to the presently determined context either by confirmation that the security settings do not have to be changed or by changing some settings.

Preferably, the system comprises at least one device, wherein the assessment of the current context and the security settings is performed for said at least one device of the system. Preferably, the current context of the device and/or the security setting is performed on said device itself. The at least one device is preferably an industrial device or a device which is embedded in an industrial control system.

The assessed current context of the system and/or device is, for instance, a temporarily taken out of service state, a testing mode, an operation mode, an emergency-shutdown mode, a maintenance mode, an end-of-life mode, decommissioned state or a not yet commissioned state.

According to a preferred embodiment, the system checks the rule set against the system environment, the applications the system is used for, the current life-cycle stage of the system and/or the usage of certain security relevant features for a certain period of time, wherein the rule set is preferably predefined or defined by the manufacturer or the vendor of the system or changeable by the user. The rule set may comprise potential security requirements and an indication as to which contexts it affects.

Preferably, the security settings are defined in a predetermined way, e.g., by the manufacturer of a vendor of the system and/or the device. The security settings may also be defined or definable by an operator and/or a user. Preferably, the security settings may also be defined in a predetermined way, a part of the security settings or the entire security settings are changeable by an operator or a user.

The security settings preferably check for Telnet, FTP, SSH, OPC Server, Local user Accounts, Password Policy, Internet Connectivity and/or Reverse Internet Connectivity.

Preferably, the provided suggested action(s) is/are compiled and displayed to the operator or user preferably together with at least one selectable action, such that the user can decide which action should be executed.

According to another preferred embodiment, the suggested action(s) is/are executed automatically, such that the operator and/or user do not have to take any active action(s). It is, however, preferred that the operator and/user is informed about the automatically executed action, e.g., by displaying the actions on a display or summarizing the actions in a report.

The present invention also relates to a device which is preferably adapted to perform the method of the present invention, e.g., as discussed above and/or as discussed in the detailed description below and as defined in the claims. The device preferably comprises a means for (self-)assessing the current context of the device, based on a defined rule set. The device preferably also comprises a means for (self-)assessing presently used security settings for the device based on the assessed current context of the device and preferably based on a predefined and customizable set of security assessment checks for said context. Preferably, the device further comprises a means for providing suggested action(s) to a user/operator on the basis of the assessed security settings and/or the assessed context, to change or confirm the present security settings of the device to the suggested settings. Thus, the method for context-aware security self-assessment of the device can be performed by the device itself without the need of an external separate security assessment computer.

The present invention also relates to a computer program product including a computer program code for controlling one or more processors of a device adapted to be connected to a communication network and/or configured to store a standardized configuration representation, particularly, a computer program product including a computer readable medium containing therein the computer program code.

The program code preferably comprises instructions executable by a computer processor, the instructions, when executed by the processor, performing a method of the present invention.

The present invention also relates to a computer readable medium having stored thereon instructions executable by a computer processor, the instructions, when executed by the processor, performing a method of the present invention.

In other words, the present invention generally relates to a context-aware device security self-assessment method or module that determines the context in which the device is used, and based on this, assesses the devices' security settings. The term "context" (in the following also labelled as mode, phase or state) may refer to the system environment, the applications the device is used for, and/or the current life-cycle stage of the device, without being limited to said contexts. The method of the present invention preferably prioritizes and rates the security relevant findings and presents them in combination with mitigation options through a web interface, a configuration tool, or through notifications in the control system.

For example, in the operational phase, the device determines whether certain enabled protocols and features are not actually used. In this case, it alerts the user and suggests a turning-off of those features.

Such a device according to the present invention preferably simplifies the engineering process due to automating parts of the security engineering work. It can reduce operational overhead for security personnel by providing auto-diagnostic functionality. It can also improve overall security since the self-assessment is performed in a reliable manner and the information provided is easy to grasp.

A further benefit is that the operator becomes aware of the recommended security settings of the vendor, can compare these settings with his own settings and thereby increases the overall cyber security posture. A feature integrated into a device preferably shows the operator or customer of the industrial device that the vendor is aware of the importance of cyber security for the devices, and knows the best practices for securing them. Moreover, the vendor can continuously monitor the security status of the devices and inform the operator if stronger security settings are possible. The vendor could also directly configure the security features so that the impact can be directly seen afterwards in the self-assessment.

BRIEF DESCRIPTION OF THE DRAWINGS

The subject matter of the invention will be explained in more detail in the following text with reference to preferred exemplary embodiments which are illustrated in the attached drawings, in which:

FIG. 3 shows a more detailed self-assessment report as presented to a user.

The reference symbols as used in the drawings and their primary meanings are listed in summary form in the list of designations. In principle, identical parts are provided with the same reference symbols in the figures.

DETAILED DESCRIPTION OF PREFERRED EMBODIMENTS

Figures 1, 2:
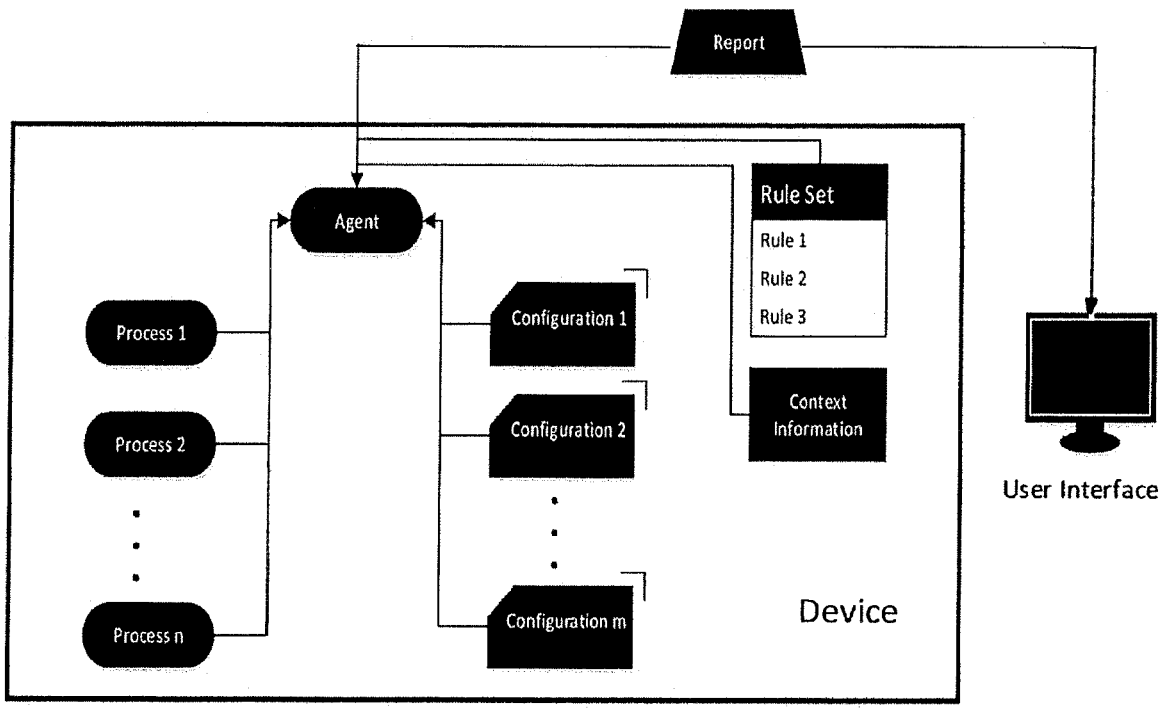
FIG. 1 shows a self-assessment mechanism through an agent that monitors processes and configurations.
FIG. 2 shows a self-assessment report as presented to a user.

According to a first preferred embodiment of the present invention, the self-assessment mechanism is embedded into a device. The mechanism or method may use an agent that is either performing an assessment periodically, according to a schedule and/or on demand. In order to carry out the self-assessment, certain inputs are preferably provided which can define what is secure:

For instance, a rule set may contain potential security requirements and preferably all potential security requirements, and an indication as to which contexts it affects. This information can be encoded, e.g., in an XML type language such as XCCDF (Extensible Configuration Checklist Description Format, which is a part of the Security Content Automation Protocol (SCAP)).

A further input preferably relates to information concerning the current context. According to the present invention, said information may be provided by an operator/user or the method of the present invention determines the context itself, preferably automatically. For example, based on attached devices, the method may determine that the device is either in testing or operational mode.

Given this information, the agent (see FIG. 1) reads in all relevant configuration files and checks all running processes to determine if there are any deviations from the security rules for the current context. For example, the use of FTP may be prohibited during operation, and a running FTP server (process) constitutes a deviation from the security rules.

The results of this analysis can be gathered and made available in form of a self-assessment report. This report (see FIG. 3) can be exported and/or shown to the operator of the system. For instance the report as illustrated in FIG. 2 can be displayed at a user display (monitor).

The exemplary report lists of FIG. 3 show a few examples of security requirements in more detail. One exemplary security requirement concerns Internet connectivity.

For instance, industrial automation and energy devices such as controllers, IEDs, etc. are generally utilized within a plant network and should not be connected to the Internet. However, due to ignorance or human error, some devices are directly connected and can even be accessed from the Internet, which can be seen on search engines created for that purpose (e.g., Shodan). This can be a serious threat for the operator of the device, as the search engine advertises the device, and search engine users are tempted to access or even hack the device. However, standalone devices may be put on the Internet on purpose. The self-assessment feature alerts in case the device is connected to the Internet.

The types of dynamic assessment that are possible can be seen in the example of the OPC server. In this case, the device has noticed that the OPC server is enabled, but has not been used for 576 days. As an enabled but unneeded OPC server may present security vulnerability, and as it does not seem the server functionality is required, the user should disable the OPC server.

The following possible checks can also be performed, but the present invention is not limited to this set.

Commissioning/Engineering Phase

Is the device integrated in a central user account management system?

Internet connectivity: Is the device connected to the Internet? Are search engines (Shodan) accessing the device?

Are certificates valid and not self-signed?

Is the device integrated into a central logging system?

Have the security settings of the device been reviewed and set?

Operational Phase

If local user accounts are used, is the password complexity and password length adequate? Were they changed when the device was put into operation?

Are unused communication protocols activated?

Are insecure industrial protocols activated? Are they used at all?

Has the device enough space for storing local logs?

Are certificates valid?

Internet connectivity: Is the device connected to the Internet? Are search engines (Shodan) accessing the device?

The following implementation in the form of a bash script shows a simple example how it is possible to determine the device context and how to perform a different security assessment depending on the relevant context. Below are screenshots from the implementation running in the "development context" and in the "production context".

Production Context:

```
$ ./security_check.sh
No recent config change, asssuming production mode.
[OK]: TCP port 21 (ftpd) is closed
Warn: TCP port 22 (sshd) is being listened on
[OK]: TCP port 23 (telnetd) is closed
[OK]: No FTP daemon is running
Warn: SSH daemon is running
[OK]: No telnet daemon is running
[OK]: no public IP address found
[OK]: Direct internet connectivity not available
```

Development Context:

```
$ touch config_file
$ ./security_check.sh
Recent config change, asssuming development mode.
[OK]: TCP port 21 (ftpd) is closed
[OK]: TCP port 23 (telnetd) is closed
[OK]: No FTP daemon is running
[OK]: No telnet daemon is running
[OK]: no public IP address found
[OK]: Direct internet connectivity not available
```

The source code of this implementation is listed below:

```
#!/bin/bash

# Script to perform basic security checks.

# Check whether config file was modified within the last 14 days.
if [ $(('date +%s' - 'stat -c %Y config_file')) -gt 1209600 ]
then
    echo "No recent config change, asssuming production mode."
    MODE=prod
else
    echo "Recent config change, asssuming development mode."
    MODE=dev
fi
# Check open ports.
function check_open_port( ) {
    PORT=$1
    MSG_OPEN=$2
    MSG_CLOSED=$3
    netstat -lnt | awk '{print $4}' | sed 's/.*:\(.*$\)/ \1/' | \
        grep -q "^$PORT\$"
    if [ $? -eq 0 ]
    then
        echo -e $MSG_OPEN
    else
        echo -e $MSG_CLOSED
    fi
}
# ftpd
check_open_port 21 \
    "\e[31mWarn:\e[0m TCP port 21 (ftpd) is being listened on" \
    "\e[32m[OK]:\e[0m TCP port 21 (ftpd) is closed"
# sshd
if [ $MODE = "prod" ]
then
    check_open_port 22 \
        "\e[31mWarn:\e[0m TCP port 22 (sshd) is being listened on" \
        "\e[32m[OK]:\e[0m TCP port 22 (sshd) is closed"
fi
# telnetd
check_open_port 23 \
    "\e[31mWarn:\e[0m TCP port 23 (telnetd) is being listened on" \
    "\e[32m[OK]:\e[0m TCP port 23 (telnetd) is closed"
# Check running programs for known programs.
# ftpd (vsftp,...)
pgrep ftpd >/dev/null
if [ $? -eq 0 ]
```

-continued

```
then
    echo -e "\e[31mWarn:\e[0m FTP daemon is running"
else
    echo -e "\e[32m[OK]:\e[0m No FTP daemon is running"
fi
# sshd (we ignore dropbear, lsh, and other implementations)
if [ $MODE = "prod" ]
then
    pgrep sshd >/dev/null
    if [ $? -eq 0 ]
    then
        echo -e "\e[31mWarn:\e[0m SSH daemon is running"
    else
        echo -e "\e[32m[OK]:\e[0m No SSH daemon is running"
    fi
fi
# telnetd
pgrep telnetd >/dev/null
if [ $? -eq 0 ]
then
    echo -e "\e[31mWarn:\e[0m telnet daemon is running"
else
    echo -e "\e[32m[OK]:\e[0m No telnet daemon is running"
fi
# Check whether we have a private or public IP address.
# Ordering: wlan0, then eth0
PRIVATEIP_REGEX='(^127\.0\.0\.1) | (^10\.) | (^172\.1[6-
9]\.) | (^172\.2[0-9]\.) | (^172\.3[0-1]\.) | (^192\.168\.) '
# Extract all PI addresses from all network interfaces
# and check for addresses outside of the private address range.
ifconfig | grep "inet addr" | awk -F: '{print $2}' | awk '{print
$1}' | \
    egrep -q -v $PRIVATEIP_REGEX
if [ $? -eq 0 ]
then
    echo -e "\e[31mWarn:\e[0m public IP address found"
else
    echo -e "\e[32m[OK]:\e[0m no public IP address found"
fi
# Check direct internet connectivity by
# pinging Google's public DNS server.
ping -c 1 8.8.8.8 >&/dev/null
if [ $? -eq 0 ]
then
    echo -e "\e[31mWarn:\e[0m Direct internet connectivity is
available"
else
    echo -e "\e[32m[OK]:\e[0m Direct internet connectivity not
available"
fi
```

Along with the suggested devices, systems and modules, respective methods for their operation are provided as well as a computer-readable medium having stored thereon instructions executable by a computer processor, the instructions, which, when executed by the processor, performing the method of the aspects as set forth above While the invention has been described in detail in the drawings and foregoing description, such description is to be considered illustrative or exemplary and not restrictive. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A method for context-aware security self-assessment of an industrial device coupled to a network, the method comprising:
    self-assessing, by the industrial device, a current context of the industrial device based on a predefined rule set;
    self-assessing, by the industrial device, presently used security settings for the industrial device based on the assessed current context of the industrial device and on a predefined and customizable set of security assessment checks for the current context; and
    providing one or more suggested actions to a user/operator, based on both the assessed security settings and the assessed current context, to adapt the presently used security settings of the industrial device, while coupled to the network, to suggested security settings.

2. The method according to claim 1, wherein the industrial device is embedded in an industrial control system.

3. The method according to claim 2, wherein the assessed current context of the industrial device is a temporarily taken out of service state, a testing mode, an operation mode, a maintenance mode, an emergency-shutdown mode, an end-of-life mode, decommissioned state or a not yet commissioned state.

4. The method according to claim 2, wherein the rule set checks for an industrial device environment, applications the industrial device is used for, a current life-cycle stage of the industrial device and/or a usage of certain security relevant features for a certain period of time.

5. The method according to claim 2, wherein the rule set comprises potential security requirements and an indication as to which contexts it affects.

6. The method according to claim 2, wherein the presently used and suggested security settings are vendor defined or definable by the user/operator.

7. The method according to claim 1, wherein the assessed current context of the industrial device is a temporarily taken out of service state, a testing mode, an operation mode, a maintenance mode, an emergency-shutdown mode, an end-of-life mode, decommissioned state or a not yet commissioned state.

8. The method according to claim 7, wherein the rule set checks for an industrial device environment, applications the industrial device is used for, a current life-cycle stage of the industrial device and/or a usage of certain security relevant features for a certain period of time.

9. The method according to claim 7, wherein the rule set comprises potential security requirements and an indication as to which contexts it affects.

10. The method according to claim 7, wherein the presently used and suggested security settings are vendor defined or definable by the user/operator.

11. The method according to claim 1, wherein the rule set checks for an industrial device environment, applications the industrial device is used for, a current life-cycle stage of the industrial device and/or a usage of certain security relevant features for a certain period of time.

12. The method according to claim 11, wherein the rule set is preferably defined by a vendor of the industrial device or changeable by the user/operator.

13. The method according to claim 11, wherein the rule set comprises potential security requirements and an indication as to which contexts it affects.

14. The method according to claim 1, wherein the rule set comprises potential security requirements and an indication as to which contexts it affects.

15. The method according to claim 1, wherein the presently used and suggested security settings are vendor defined or definable by the user/operator.

16. The method according to claim 1, wherein the presently used and suggested security settings check for Telnet, FTP, SSH, OPC Server, Local user Accounts, Password Policy, Internet Connectivity, Reverse Internet Connectivity.

17. The method according to claim 1, further comprising:
compiling and displaying to the user/operator the provided one or more suggested actions, at least one of the displayed one or more suggested actions being user/operator-selectable, thereby allowing the user/operator to select which of the one or more suggested actions to execute.

18. The method according to claim 1, wherein the provided one or more suggested actions are executed automatically.

19. The method according to claim 1, wherein the industrial device is embedded in an Industrial Automation and Control System (IACS).

20. An industrial device configured to be coupled to a network, the industrial device comprising:
a non-transitory computer-readable medium comprising instructions; and
one or more processors in communication with the non-transitory computer-readable medium, wherein the one or more processors execute the instructions to:
self-assess a current context of the industrial device it presently operates, based on a predefined rule set;
self-assess presently used security settings for the industrial device based on the assessed current context of the industrial device and on a predefined and customizable set of security assessment checks for the current context; and
provide one or more suggested actions to a user/operator, based on both the assessed security settings and the assessed current context, to adapt the presently used security settings of the industrial device, while coupled to the network, to suggested security settings.

21. A non-transitory computer readable medium comprising:
a set of instructions for context-aware security self-assessment of an industrial device coupled to a network when executed by a processor of the industrial device are effective to:
self-assess a current context of the industrial device it presently operates, based on a predefined rule set;
self-assess presently used security settings for the industrial device based on the assessed current context of the industrial device and on a predefined and customizable set of security assessment checks for the current context; and
provide one or more suggested actions to a user/operator, based on both the assessed security settings and the assessed current context, to adapt the presently used security settings of the industrial device, while coupled to the network, to suggested security settings.

* * * * *